(12) United States Patent
Oyama

(10) Patent No.: US 9,025,053 B2
(45) Date of Patent: May 5, 2015

(54) IMAGING APPARATUS AND IMAGE RESTORATION METHOD

(75) Inventor: Ichiro Oyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 635 days.

(21) Appl. No.: 13/319,348

(22) PCT Filed: Apr. 20, 2011

(86) PCT No.: PCT/JP2011/002315
§ 371 (c)(1),
(2), (4) Date: Nov. 8, 2011

(87) PCT Pub. No.: WO2011/132415
PCT Pub. Date: Oct. 27, 2011

(65) Prior Publication Data
US 2012/0099001 A1    Apr. 26, 2012

(30) Foreign Application Priority Data
Apr. 23, 2010    (JP) ................................ 2010-100304

(51) Int. Cl.
H04N 5/217    (2011.01)
H04N 1/409    (2006.01)
(Continued)

(52) U.S. Cl.
CPC ................ H04N 1/409 (2013.01); G06T 5/003 (2013.01)

(58) Field of Classification Search
CPC ....... G06T 5/20; H04N 5/235; H04N 5/23229
See application file for complete search history.

(56) References Cited

U.S. PATENT DOCUMENTS

| 5,294,976 A | 3/1994 | Ohyama et al. |
| 5,450,128 A | 9/1995 | Ohyama et al. |

(Continued)

FOREIGN PATENT DOCUMENTS

| CN | 101222583 | 7/2008 |
| CN | 101388952 | 3/2009 |

(Continued)

OTHER PUBLICATIONS

International Search Report issued May 31, 2011 in International (PCT) Application No. PCT/JP2011/002315.
(Continued)

*Primary Examiner* — Christopher K Peterson
(74) *Attorney, Agent, or Firm* — Wenderoth, Lind & Ponack, L.L.P.

(57) ABSTRACT

An imaging apparatus restores a deteriorated image to a high-resolution image when the deteriorated image is restored based on a PSF image captured by an optical system. An imaging apparatus includes an optical system, and a PSF capturing unit that acquires point spread function (PSF) information captured by the optical system and outputs corrected PSF information. A subject capturing unit acquires subject information captured by the optical system and outputs the subject information; and an image restoration unit performs a restore operation for restoring the subject information, based on the corrected PSF information and the subject information. The PSF capturing unit subtracts a correction luminance value from the PSF information, and outputs the corrected PSF information. The correction luminance value is greater by a luminance value Is than a luminance value Nf of fixed value noise that does not fluctuate with time.

10 Claims, 14 Drawing Sheets

(51) Int. Cl.
*G06T 5/00* (2006.01)
*H04N 5/208* (2006.01)

(56) References Cited

U.S. PATENT DOCUMENTS

| | | | |
|---|---|---|---|
| 7,990,438 B2 | 8/2011 | Kamo | |
| 8,159,552 B2 | 4/2012 | Lim et al. | |
| 8,391,637 B2 | 3/2013 | Kinoshita | |
| 2007/0172141 A1* | 7/2007 | Bando | 382/261 |
| 2008/0165261 A1 | 7/2008 | Kamo | |
| 2009/0066818 A1 | 3/2009 | Lim et al. | |
| 2010/0074520 A1 | 3/2010 | Kinoshita | |
| 2010/0079626 A1 | 4/2010 | Hatakeyama | |
| 2011/0205402 A1* | 8/2011 | Kumar et al. | 348/240.3 |

FOREIGN PATENT DOCUMENTS

| | | |
|---|---|---|
| CN | 101685534 | 3/2010 |
| JP | 60-250483 | 12/1985 |
| JP | 62-127976 | 6/1987 |
| JP | 6-098170 | 4/1994 |
| JP | 2004-038362 | 2/2004 |
| JP | 2004-186789 | 7/2004 |
| JP | 2005-017136 | 1/2005 |
| JP | 2008-172321 | 7/2008 |
| JP | 2009-031109 | 2/2009 |
| JP | 2009-163642 | 7/2009 |
| JP | 2010-087671 | 4/2010 |

OTHER PUBLICATIONS

Digital Image Processing (Jul. 22, 2004 CG—ARTS Association), p. 146.

An Office Action, issued Aug. 27, 2013 along with a Search Report in a Chinese application that is a foreign counterpart to the present application Report (with English translation of Search Report).

* cited by examiner

IMAGING APPARATUS AND IMAGE RESTORATION METHOD

TECHNICAL FIELD

The present invention relates to technology for restoring an image deteriorated when the image was captured to an image that is less deteriorated.

BACKGROUND OF INVENTION

Background Art

Techniques for restoring an image deteriorated when the image was captured due to a factor such as defocus, blur, or aberration of an optical system to an image that is less deteriorated have been progressively developed. For example, with the technique disclosed in Patent Literature 1, it is possible to obtain a restored image by correcting deterioration of a deteriorated image (captured image) that is deteriorated due to defocus, blur, aberration, or the like in accordance with a restore operation using a correction function having inverse characteristics of those of a point spread function (PSF) resulting from defocus, blur, aberration, or the like. In many cases, such correction functions are created using PSF data created by a computer based on design data or the like.

Further, with the technique disclosed in Patent Literature 2, when it is difficult to create PSF data, a restore operation for restoring a deteriorated image is performed using PSF data obtained by actual shooting.

CITATION LIST

Patent Literature

[PTL 1] Japanese Unexamined Patent Application Publication No. 62-127976
[PTL 2] Japanese Unexamined Patent Application Publication No. 2009-163642

SUMMARY OF INVENTION

However, in the case where a restore operation for restoring a deteriorated image is performed using PSF data created by a computer based on design data or the like, a high-resolution restored image cannot be obtained when there is a big difference between a PSF indicated by the PSF data and the actual PSF due to, for instance, a large mounting error being generated when the camera is assembled. Thus, it may be necessary to perform image restoration using a PSF image obtained by actual shooting, rather than using the PSF data created by the computer.

Also, in the case where a restore operation for restoring a deteriorated image is performed using a PSF image obtained by shooting a point light source, rather than using PSF data created by a computer as in Patent Literature 2, especially if unnecessary luminance (hereinafter, described as "noise" as appropriate) of an imaging device is high when the PSF image is captured, the PSF shown by the PSF image differs from the actual PSF. Consequently, this results in a problem that a high-resolution restored image cannot be obtained.

In view of this, the present invention has been conceived to solve the above problems, and an object thereof is to provide an imaging apparatus and an image restoration method that enable restoration of a deteriorated image to a high-resolution image when the deteriorated image is restored based on a PSF image captured by an optical system.

In order to achieve the above object, an imaging apparatus according to an aspect of the present invention includes: an optical system; a PSF capturing unit configured to acquire point spread function (PSF) information captured by the optical system, and output corrected PSF information; a subject capturing unit configured to acquire subject information captured by the optical system, and output the acquired subject information; and an image restoration unit configured to perform a restore operation for restoring the subject information, based on the corrected PSF information and the subject information, wherein the PSF capturing unit is configured to subtract a correction luminance value from the PSF information, and output the corrected PSF information obtained as a result of the subtraction, the correction luminance value being greater by a luminance value Is than a luminance value Nf of fixed value noise that does not fluctuate with time.

In this manner, it is possible to reduce the influence of random noise included in the PSF information captured by the optical system by subtracting the luminance value greater than the fixed value noise from the PSF information. Consequently, this enables restoration of a deteriorated image to a high-resolution image.

According to an imaging apparatus according to an aspect of the present invention, when an image restore operation is performed, even in the case where unnecessary luminance (especially, random noise that fluctuates with time) of a captured PSF image is high, the unnecessary luminance is reduced so as to correct a luminance average value to an appropriate value, thereby obtaining more accurate restoration information and enabling high-resolution image restoration.

DETAILED DESCRIPTION OF INVENTION

The following is a description of a factor that makes high-resolution image restoration difficult when unnecessary luminance (noise) of a captured PSF image is high, before giving a description of embodiments of the present invention.

Figure 2:
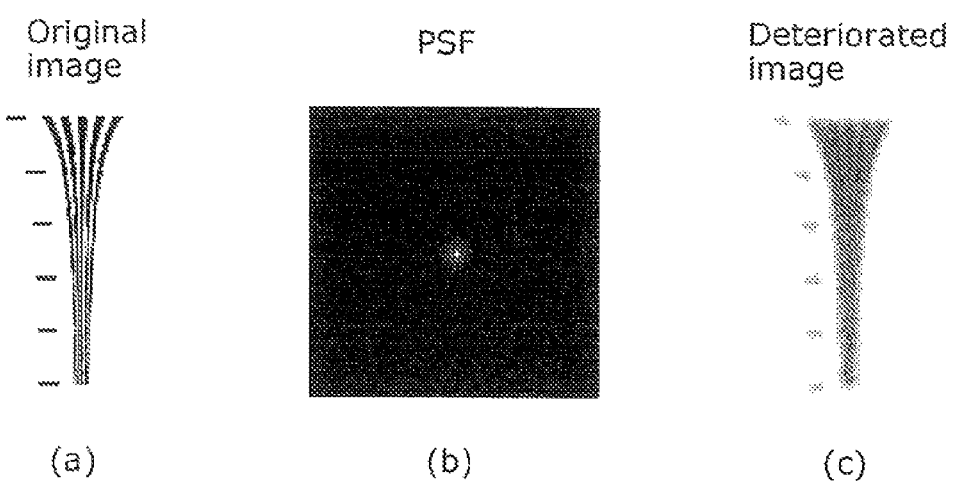
FIG. 2 illustrates the relationship among an original image, a PSF image, and a deteriorated image in the embodiments of the present invention.

A factor that makes high-resolution image restoration difficult when noise of a captured PSF image is large will now be described with reference to FIGS. 2 to 9. (a) in FIG. 2 shows an original image (subject) having no deterioration. The image is a cuneal chart generally used when the resolution of a captured image is measured. (b) in FIG. 2 shows an example of a PSF image captured by an optical system.

Due to, for instance, defocus, blur, or aberration of the optical system, a point image has finite spread as shown in (b) in FIG. 2. Accordingly, the original image in (a) in FIG. 2 will be formed on an imaging device via the optical system, as a deteriorated image having a lower resolution as shown in (c) in FIG. 2. It is known that a deteriorated image is expressed using convolution integral of an original image and a PSF image that has been normalized such that a luminance integral value of the entire image region is "1".

Figure 3:
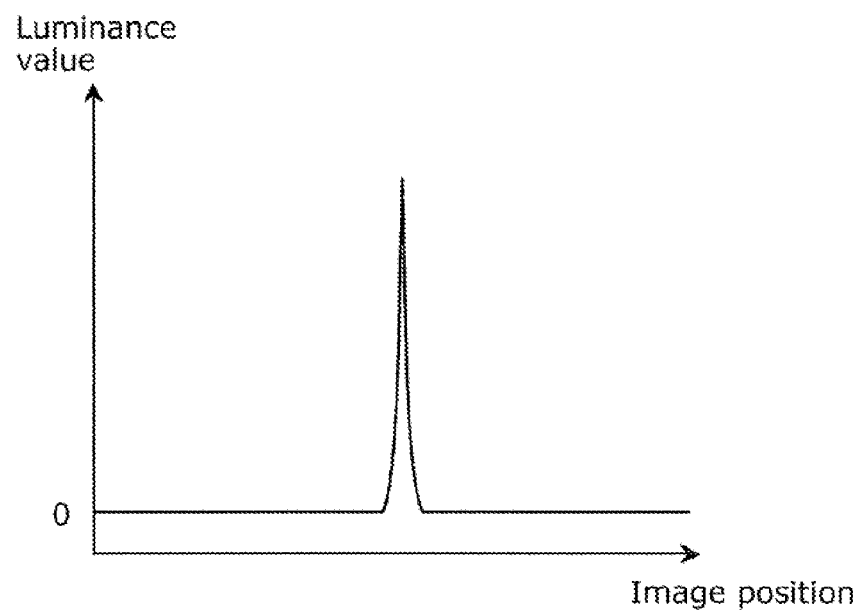
FIG. 3 shows a PSF luminance distribution in the embodiments of the present invention.

It should be noted that FIG. 3 shows a luminance distribution in an enlarged periphery of a region having the highest luminance on lines that include a portion having the highest luminance of the PSF image in (b) in FIG. 2. FIG. 3 shows a luminance distribution when the PSF image includes no noise. Although the expression of the luminance of an image differs depending on a system on which the present invention is mounted, "0" represents black, and "1.0" represents white, here.

Figure 4:
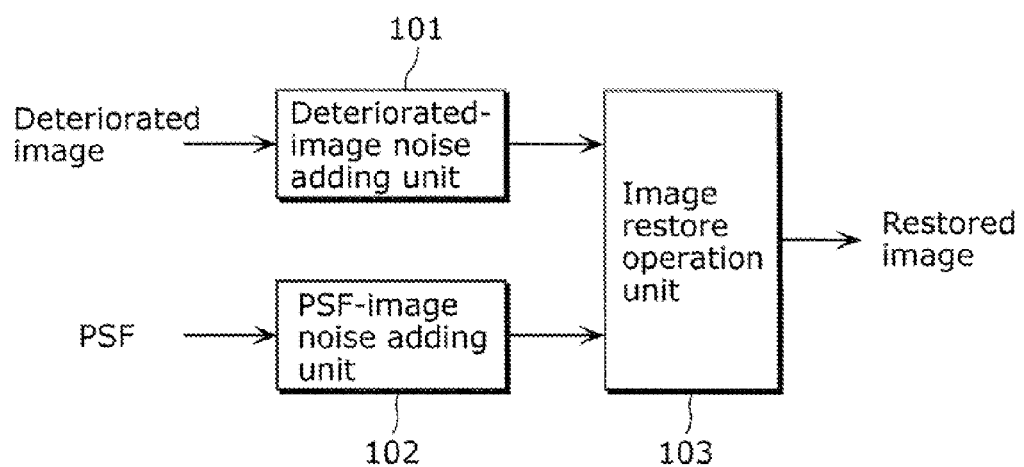
FIG. 4 shows a simulator for verifying the influence exerted by noise on a restored image in the embodiments of the present invention.

FIG. 4 is a block diagram showing a simulator for examining the influence exerted by noise mixed in a deteriorated image and that in a PSF image when a subject image formed on the imaging device is captured. The simulator includes a deteriorated-image noise adding unit 101 that adds noise to a deteriorated image including no noise, a PSF-image noise adding unit 102 that adds noise to a PSF image including no noise, and an image restore operation unit 103. It is possible to examine the influence of noise exerted on each of the deteriorated image and the PSF image using this simulator.

Noise is assumed to be Gaussian noise. The influence of the noise can be examined by changing the standard deviation σ of the Gaussian noise. For example, if noise values at respective image positions are obtained in advance, this enables compensation, with ease, of fixed value noise that hardly changes with time depending on image positions (e.g., dark current noise, noise that occurs in predetermined lines or at predetermined pixel positions due to manufacturing defects of the imaging device, or the like), and thus such fixed value noise is not taken into consideration here. Specifically, the influence of noise is examined, taking into consideration only random noise (assumed to be Gaussian noise) that randomly changes with time and that is difficult to be compensated. It should be noted that an image position is a position on an image, and is typically a position of a pixel that constitutes the image. Further, Gaussian noise is noise in which the distribution of luminance values of noise components approximates a Gaussian distribution.

The image restore operation unit 103 may perform an image restore operation using an algorism known as an image restore algorithm; such as the Wiener filter or the Richardson-Lucy algorithm. Here, the image restore operation unit 103 has a configuration of obtaining a restored image by performing an image restore operation using the Wiener filter.

For the configuration of the Wiener filter Hw(u, v), Expression 1 below, for example, may be used, which is described in Non Patent Literature (*Digital Image Processing*: CG-ARTS Society, Jul. 22, 2004, p. 146).

$$Hw(u,v)=1/H(u,v)\cdot |H(u,v)|^2/(|H(u,v)|^2+K) \quad \text{(Expression 1)}$$

Here, H(u, v) represents an optical transfer function (OTF) that is the Fourier transform of a PSF image. Further, "u" represents the address of an array where frequency components in the vertical direction of the PSF image are stored. Also, "v" represents the address of an array where frequency components in the horizontal direction of the PSF image are stored. "K" is an appropriate constant.

The image restore operation unit 103 multiplies Fourier transform data of a deteriorated image by the Wiener filter Hw(u, v) for each frequency component, and generates a restored image by performing inverse Fourier transform on the multiplication results. The cuneal chart shown in (a) in FIG. 2 is used as a subject. The PSF-image noise adding unit 102 adds noise to the PSF image in (b) in FIG. 2 as necessary, and thereafter the obtained image is normalized such that the luminance integral value of the entire region is 1. The resultant image is used as a PSF image.

Figure 5:
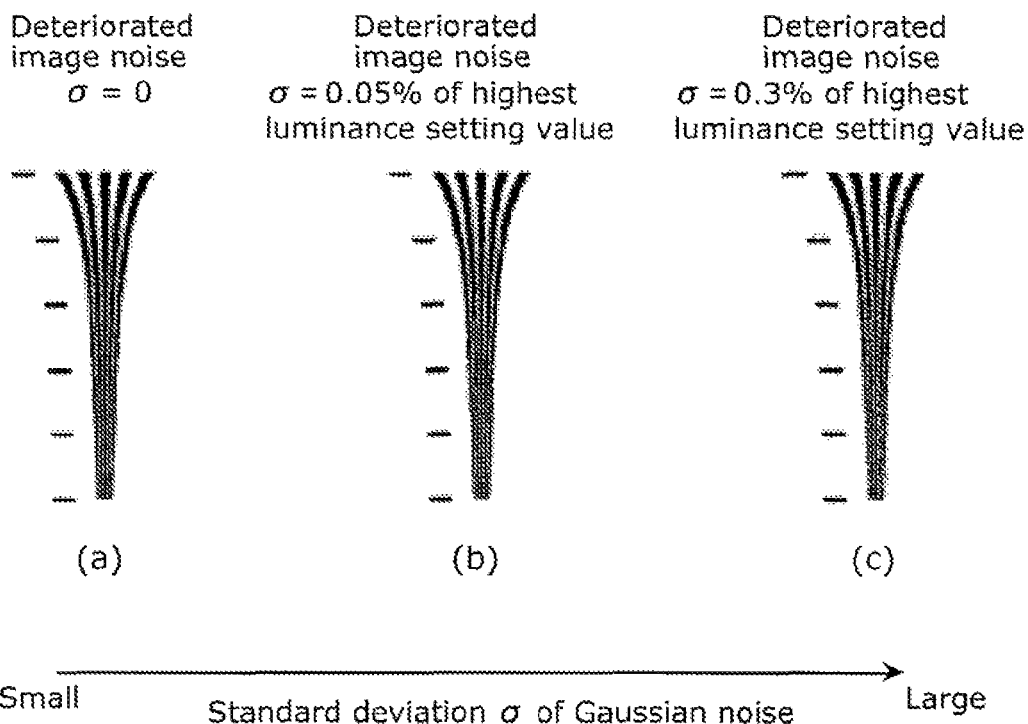
FIG. 5 illustrates the relationship between noise included in a deteriorated image and a restored image in the embodiments of the present invention.

(a), (b), and (c) in FIG. 5 show restored images respectively corresponding to standard deviations σ in the case where the deteriorated-image noise adding unit 101 adds Gaussian noise whose standard deviation σ has been changed to the deteriorated image in (c) in FIG. 2. The PSF image and the deteriorated image are 512×512 pixel images, as examples.

Specifically, (a), (b), and (c) in FIG. 5 show restored images in the case where the standard deviation σ is set to 0%, 0.05%, and 0.3% of the highest luminance setting value (here, the highest luminance setting value is "1" since "0" indicates black, and "1.0" indicates white) of the deteriorated image. Noise is not added to the PSF image at this time. As is clear from (a), (b), and (c) in FIG. 5, the resolution of the restored images is slightly decreased as the standard deviation σ is increased. It should be noted that the highest luminance setting value is a value indicating the highest luminance among values that each indicate a luminance.

Figure 6:
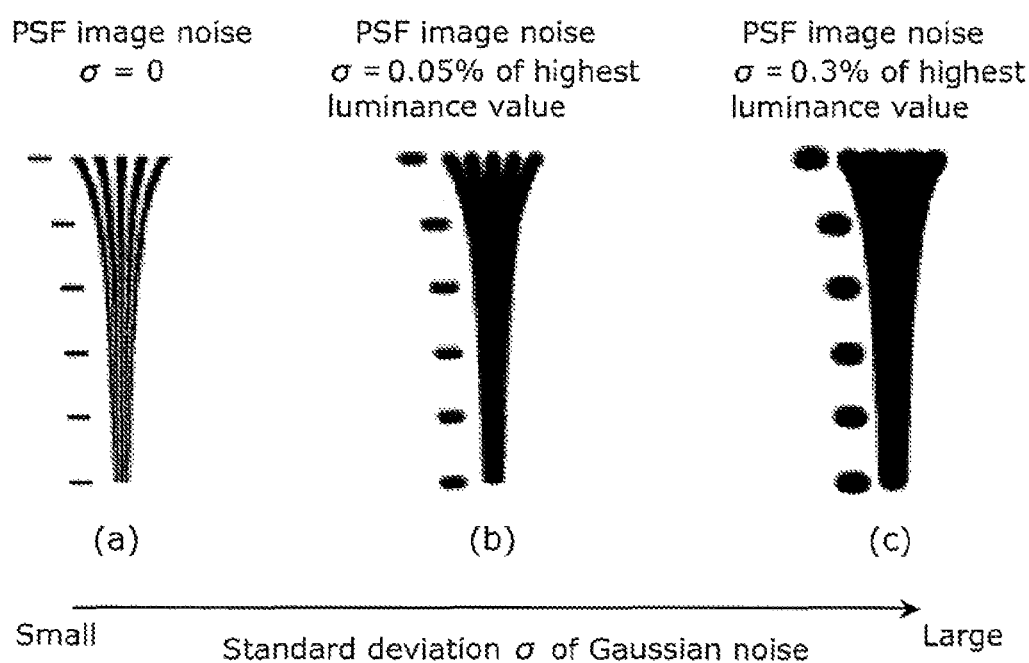
FIG. 6 illustrates the relationship between noise included in a PSF image and a restored image in the embodiments of the present invention.

(a), (b), and (c) in FIG. 6 show restored images respectively corresponding to standard deviations σ in the case where the PSF-image noise adding unit 102 adds Gaussian noise whose standard deviation σ has been changed to the PSF image in (b) in FIG. 2. Specifically, (a), (b), and (c) in FIG. 6 show restored images in the case where the standard deviation σ of Gaussian noise is set to 0%, 0.05%, and 0.3% of the highest luminance value of the PSF image. Noise is not added to the deteriorated image at this time. As is clear from (a), (b), and (c) in FIG. 6, the resolution of the restored images is significantly decreased as the standard deviation σ is increased.

It should be noted that the highest luminance value of the PSF image is a luminance value at an image position that shows the highest luminance in the PSF image. Specifically, the highest luminance value of the PSF image is a luminance value of a pixel that shows the highest luminance among pixels that constitute the PSF image, for example.

Figure 7:
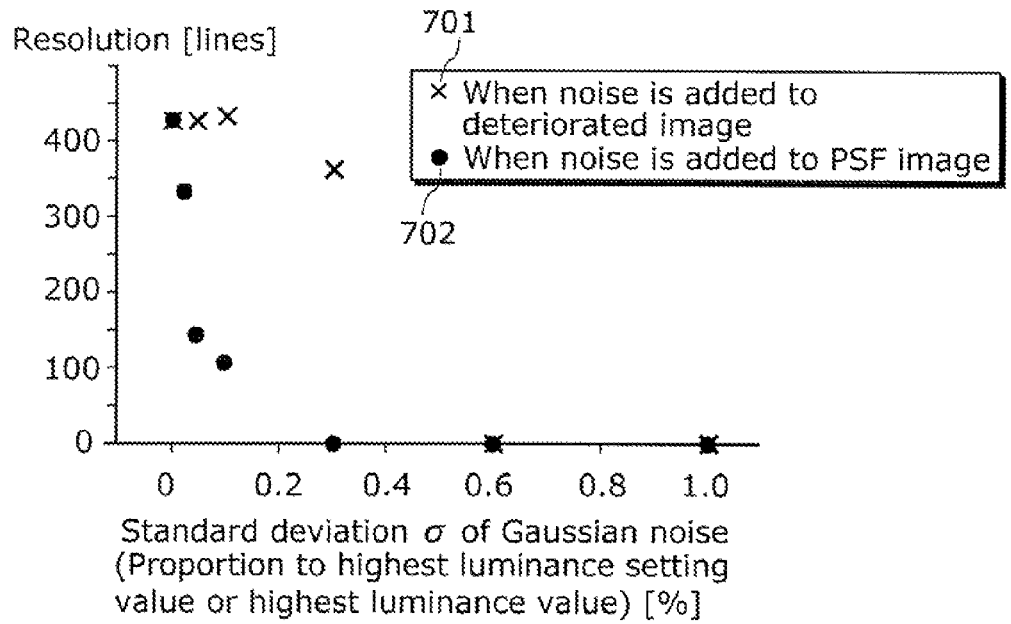
FIG. 7 illustrates the relationship between a resolution of a restored image and noise included in a deteriorated image and a PSF image in the embodiments of the present invention.

FIG. 7 shows the result of comparison of the change in the resolution of restored images in the case where the standard deviation σ of Gaussian noise is changed. In FIG. 7, numeral 701 denotes the resolution of a restored image in the case where Gaussian noise is added only to a deteriorated image. Further, numeral 702 denotes the resolution of a restored image in the case where Gaussian noise is added only to a PSF image.

The standard deviation σ of Gaussian noise to be added to the deteriorated image is represented by the proportion to the highest luminance setting value. Further, the standard deviation σ of Gaussian noise to be added to the PSF image is represented by the proportion to the highest luminance value. Here, when Gaussian noise is added to the PSF image, the PSF image has been normalized such that the highest luminance value is the highest luminance setting value "1.0", and comparison is performed on the condition that the same noise is added to the deteriorated image and the PSF image.

The resolution is measured using the resolution measurement tool HYRes3.1 distributed by CIPA, with reference to CIPA DC-003 "Resolution Measurement Methods for Digital Cameras". The resolution measured in this manner indicates that the more lines are measured, the higher the resolution is. It should be noted that in the embodiments of the present invention, the number of lines of resolution of a restored image that is restored in the case where Gaussian noise is not added to either the deteriorated image or the PSF image is 428.

As is clear from FIG. 7, the resolution of a restored image changes depending on the ratio between an image signal and the standard deviation σ of Gaussian noise. Further, it can be seen that when the standard deviation σ of Gaussian noise is increased, the resolution of the PSF image more significantly decreases compared with that of the deteriorated image.

In the case where Gaussian noise is added only to the deteriorated image, when the standard deviation σ of Gaussian noise is equal to or greater than 0.6% of the highest luminance setting value, the resolution significantly decreases, and the number of lines of resolution becomes 0 (which cannot be measured). On the other hand, in the case where Gaussian noise is added only to the PSF image, when the standard deviation σ of Gaussian noise is equal to or greater than 0.3% of the highest luminance value, the resolution significantly decreases, and the number of lines of resolution becomes 0.

Consequently, it has been found that noise included in the PSF image has greater negative influence on a restored image than the noise included in the deteriorated image. Note that when the resolution of the deteriorated image in (c) in FIG. 2, which has not been restored, is measured, the result will indicate that measurement cannot be performed because of the influence of blur due to aberration, regardless of whether noise is included, and the number of lines of the resolution is 0.

The result obtained by verifying the factor of a great decrease in the resolution of a restored image due to noise included in the PSF image will be described with reference to FIGS. 8 and 9.

Figure 8:
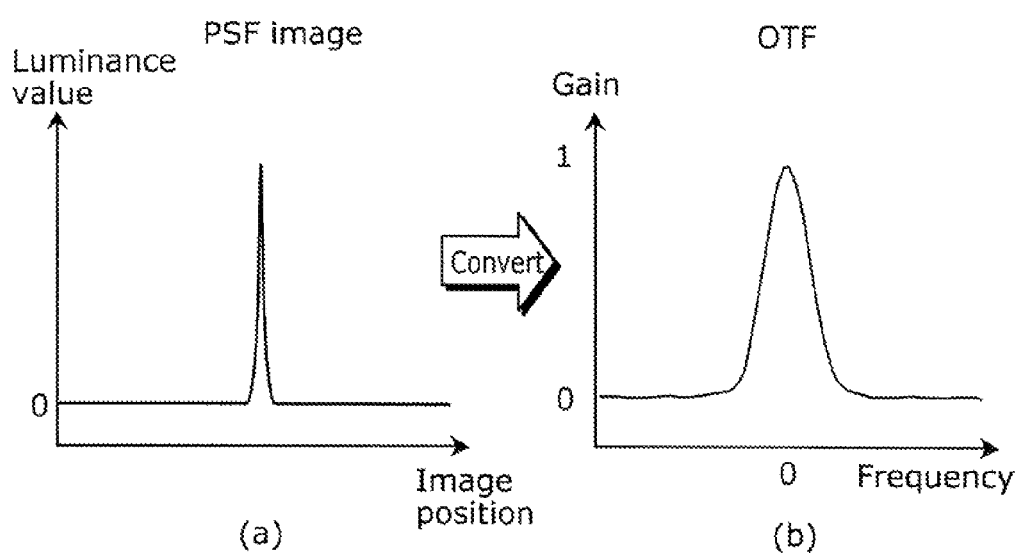
FIG. 8 shows ideal PSF information in the embodiments of the present invention.

(a) in FIG. 8 shows a luminance distribution of enlarged lines in the periphery of a portion having the highest luminance of the PSF image in (b) in FIG. 2. Here, the PSF image does not include noise.

(b) in FIG. 8 shows the gain of an OTF that is the Fourier transform of the PSF image that does not include noise. The OTF in (b) in FIG. 8 has been normalized such that the gain of the direct-current component (at a frequency of 0) is 1. The horizontal axis in (b) in FIG. 8 represents frequency, and the right side thereof relative to the direct-current component (at a frequency of 0) represents positive frequency, whereas the left side thereof represents negative frequency. For the PSF image in (b) in FIG. 2, an example is used in which a luminance distribution is symmetrical with the image position having the highest luminance being the center. In view this, to simplify the gain distribution, in (b) in FIG. 8 and the following drawings that show an OTF, one line's worth data including direct-current component data in the vertical and horizontal directions in the two-dimensionally arrayed OTF is extracted and displayed.

Figure 9:
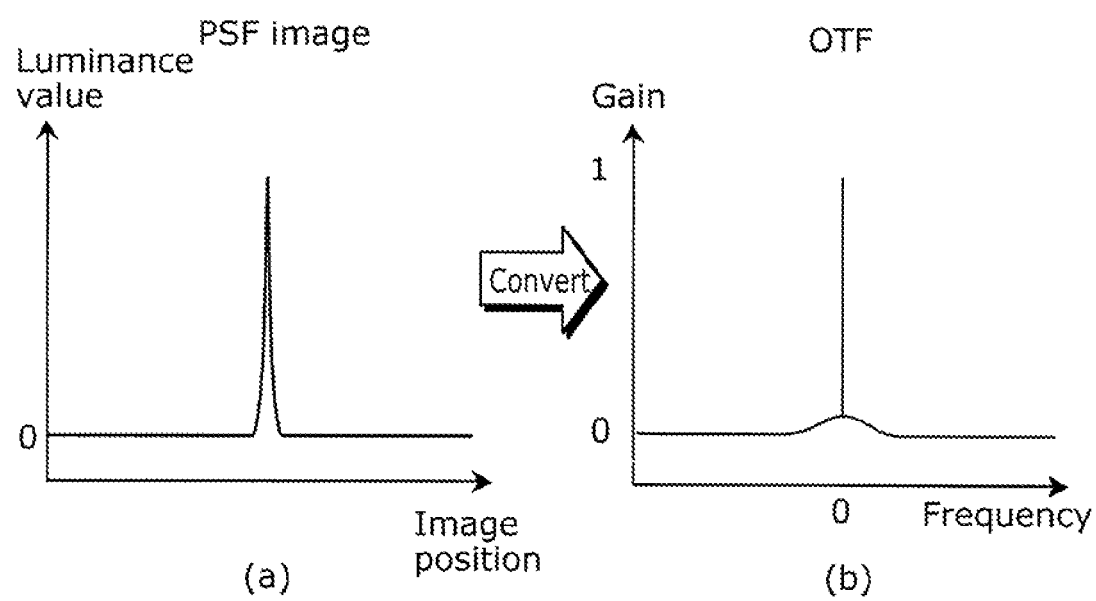
FIG. 9 shows PSF information including noise in the embodiments of the present invention.

(a) in FIG. 9 shows a luminance distribution of enlarged lines in the periphery of a portion having the highest luminance of an image obtained by adding Gaussian noise whose standard deviation σ is 0.3% of the highest luminance value to the PSF image in (b) in FIG. 2. (b) in FIG. 9 shows the gain of an OTF that is the Fourier transform of the PSF image that includes this noise. The OTF in (b) in FIG. 9 has also been normalized such that the gain of the direct-current component (at a frequency of 0) is 1.

Compared with (b) in FIG. 8, it can be seen from (b) in FIG. 9 that the gain of a component at a frequency of 0 (direct-current component) is much greater compared with the gain of other frequency components. A conceivable reason for this is that most of the entire PSF image in (b) in FIG. 2 is a region having a low luminance, and the addition of noise to that low-luminance region greatly changes the average luminance value (=direct-current component) of the entire PSF image.

Therefore, the resolution of a restored image is greatly decreased due to an increase in the difference between the OTF of the captured PSF image and the actual OTF. It should be noted that even if a general filter that reduces random noise, such as a median filter, frame integration, or a low-pass filter, is caused to operate on the PSF image, it is difficult to completely eliminate random noise from a region of the PSF image where the luminance is low. Thus, it is difficult to eliminate a change in the average luminance value of the entire PSF image.

As described above, in the case where a deteriorated image is restored using a captured PSF image, the average luminance value of the PSF image changes due to the influence of random noise (Gaussian noise), which is difficult to be corrected, thereby causing a great change in the direct-current component of the frequency components of the PSF. Consequently, a high-resolution restored image cannot be obtained. Such a problem is revealed by the examination using the simulator in FIG. 4.

In view of the above, the following is a description of an imaging apparatus according to one aspect of the present invention, the apparatus being capable of solving the above problems.

Embodiment 1

The following is a description of Embodiment 1 of the present invention with reference to the drawings.

Figure 1:
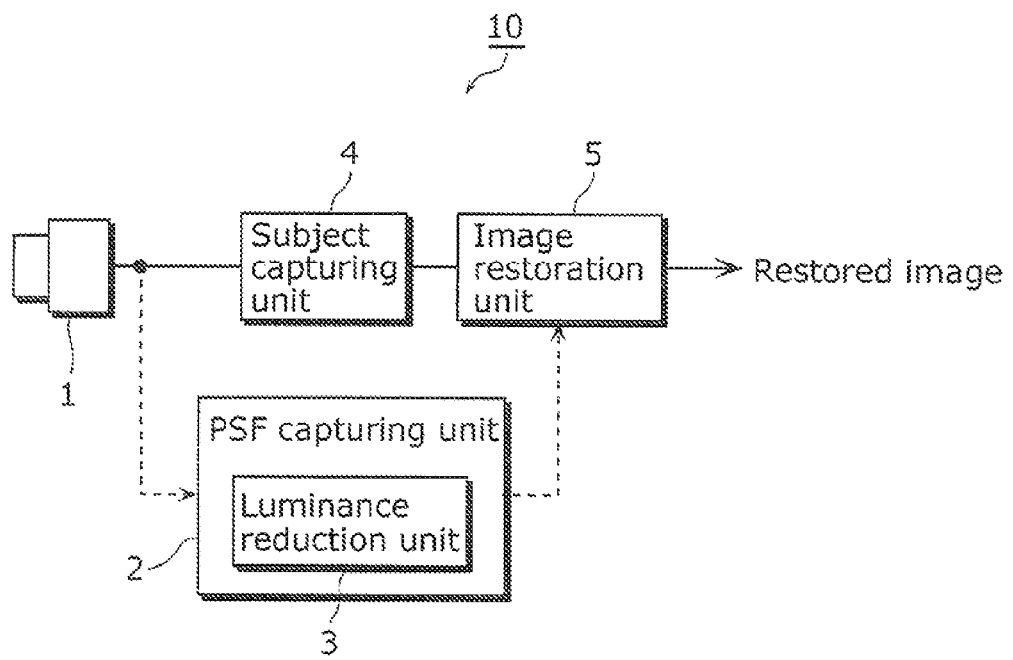
FIG. 1 is a block diagram showing a configuration of an imaging apparatus according to Embodiments 1 and 2 of the present invention.

FIG. 1 is a block diagram showing a configuration of an imaging apparatus according to Embodiment 1 of the present invention. An imaging apparatus 10 includes an optical system 1, a PSF capturing unit 2 that includes a luminance reduction unit 3, a subject capturing unit 4, and an image restoration unit 5.

The optical system 1 captures a subject image. Specifically, the optical system 1 includes a lens and an imaging device, for example. The optical system 1 generates a PSF image I_psf(x, y) by capturing a point image or a subject image corresponding to a point image. Further, the optical system 1 generates a subject image I_img(x, y) by capturing an arbitrary subject image.

The PSF capturing unit 2 causes the optical system 1 to capture a point image or a subject image corresponding thereto in order to acquire a PSF corresponding to the optical system 1, obtains the PSF image I_psf(x, y) from the optical system 1, and stores the image. Here, x represents an image position in the vertical direction in the image, whereas y represents an image position in the horizontal direction.

In other words, the PSF capturing unit 2 acquires PSF information. Here, PSF information is based on the PSF image I_psf(x, y) captured by the optical system 1. Specifically, PSF information indicates the PSF image I_psf(x, y) itself, for example. Alternatively, PSF information may be information obtained by converting the PSF image I_psf(x, y) from the spatial domain into the frequency domain, for example.

When there is known fixed value noise that does not change with time depending on image positions (e.g., dark current noise, noise that occurs in predetermined lines or at predetermined pixel positions due to manufacturing defects of the imaging device, or the like), the luminance reduction unit 3 subtracts a luminance value Nf(x, y) of the fixed value noise obtained in advance at each image position of the PSF image I_psf(x, y) from the PSF image I_psf(x, y) as shown by Expression 2.

$$Ir1\_psf(x,y)=I\_psf(x,y)-Nf(x,y) \quad \text{(Expression 2)}$$

Furthermore, the luminance reduction unit 3 subtracts a predetermined luminance value Is1 from all positions of the PSF image Ir1_psf(x, y) obtained by subtracting the luminance value of the fixed value noise, as shown by Expression 3. Specifically, the luminance reduction unit 3 subtracts a luminance value greater than the luminance value of the fixed value noise from the PSF image I_psf(x, y) through subtraction processing in accordance with Expressions 2 and 3.

$$Ir2\_psf(x,y)=Ir1\_psf(x,y)-Is1 \quad \text{(Expression 3)}$$

It should be noted that the luminance value is 0 at a position where the luminance value is negative in the PSF image Ir1_psf(x, y) obtained by subtracting the luminance value of the fixed value noise. In other words, in the PSF image Ir1_psf (x, y) obtained by subtracting the luminance value of the fixed value noise, the luminance value at a position where the luminance value is smaller than the lowest luminance setting value is changed to the lowest luminance setting value. Here, the lowest luminance setting value is a value that indicates the lowest luminance among values that each indicate a luminance, and is 0 in the present embodiment.

Although Expressions 2 and 3 are described as separate expressions, the luminance reduction unit 3 may rationalize the calculation by performing Expressions 2 and 3 in the same step. The PSF capturing unit 2 outputs the corrected PSF image Ir2_psf(x, y) obtained by subtracting the luminance value. The corrected PSF image Ir2_psf(x, y) is normalized as necessary, and the result is output.

In this manner, the PSF capturing unit 2 subtracts, from PSF information, a correction luminance value greater by the luminance value Is1 than the luminance value Nf of the fixed value noise that does not fluctuate with time using the luminance reduction unit 3, and outputs corrected PSF information obtained as a result of the subtraction. Specifically, the PSF capturing unit 2 subtracts the correction luminance value from the entire region represented by the PSF information.

In other words, the PSF capturing unit 2 subtracts the correction luminance value greater by the luminance value Is1 than the luminance value Nf of the fixed value noise from the luminance value of each pixel that constitutes the PSF image I_psf(x, y). Furthermore, when the subtraction result is smaller than the lowest luminance setting value, the PSF capturing unit 2 generates the corrected PSF image Ir2_psf(x, y) by correcting the subtraction result so as to match the lowest luminance setting value.

Then, the PSF capturing unit 2 outputs corrected PSF information based on the corrected PSF image Ir2_psf(x, y) generated in this manner. The corrected PSF information indicates the corrected PSF image Ir2_psf(x, y) itself, for example. Alternatively, the corrected PSF information may be information obtained by converting the corrected PSF image Ir2_psf(x, y) from the spatial domain into the frequency domain, for example.

It should be noted that the reason for subtracting the luminance value Is1 and the setting range of the luminance value Is1 will be described below.

The subject capturing unit 4 stores subject images I_img(x, y) of various subjects acquired by the optical system 1. The subject capturing unit 4 may perform compensation of the fixed value noise or noise compensation processing such as median filtering on the subject images I_img(x, y), as necessary.

Specifically, the subject capturing unit 4 acquires a subject image I_img(x, y) captured by the optical system 1, and outputs subject information. Here, subject information is information based on the acquired subject image I_img(x, y). For example, subject information is information that indicates the subject image I_img(x, y) itself. Further, subject information may be information that indicates an image obtained by performing various types of noise compensation processing on the subject image I_img(x, y), for example. Also, subject information may be information obtained by converting the subject image I_img(x, y) or an image obtained as a result of performing various types of noise compensation processing on the subject image I_img(x, y) from the spatial domain into the frequency domain, for example.

The image restoration unit 5 creates a restored image by performing an image restore operation such as Wiener filtering based on the corrected PSF image and the subject image. Specifically, the image restoration unit 5 performs a restore operation for restoring subject information based on the corrected PSF information and the subject information. In other words, the image restoration unit 5 generates a restored image having a higher resolution than that of the image indicated by the subject information, by performing an image restore operation for causing corrected PSF information to affect the subject information.

Specifically, the image restoration unit 5, for example, converts the corrected PSF image Ir2_psf(x, y) indicated by the corrected PSF information and the subject image I_img(x, y) indicated by the subject information from the spatial domain into the frequency domain, and computes a value of a frequency component at each frequency, thereby generating a restored image.

It should be noted that the corrected PSF image Ir2_psf(x, y) may be an image once captured and corrected at the time of factory shipment, maintenance, or the like. Specifically, the image restoration unit 5 may have a storage means such as a memory, store in advance the corrected PSF image Ir2_psf(x, y) generated by the PSF capturing unit 2, and generate a restored image using the stored corrected PSF image Ir2_psf (x, y). In other words, the PSF capturing unit 2 need not necessarily generate the corrected PSF image Ir2_psf(x, y) each time the subject image I_img(x, y) is changed.

Further, the image restoration unit 5 may store frequency-domain data that is the Fourier transform of the corrected PSF image Ir2_psf(x, y) according to an image restore algorithm, rationalization of calculation, or the like. In other words, the image restoration unit 5 may store corrected PSF information.

Next is a description of various operations of the imaging apparatus having the above configuration according to the present embodiment.

Figure 10:
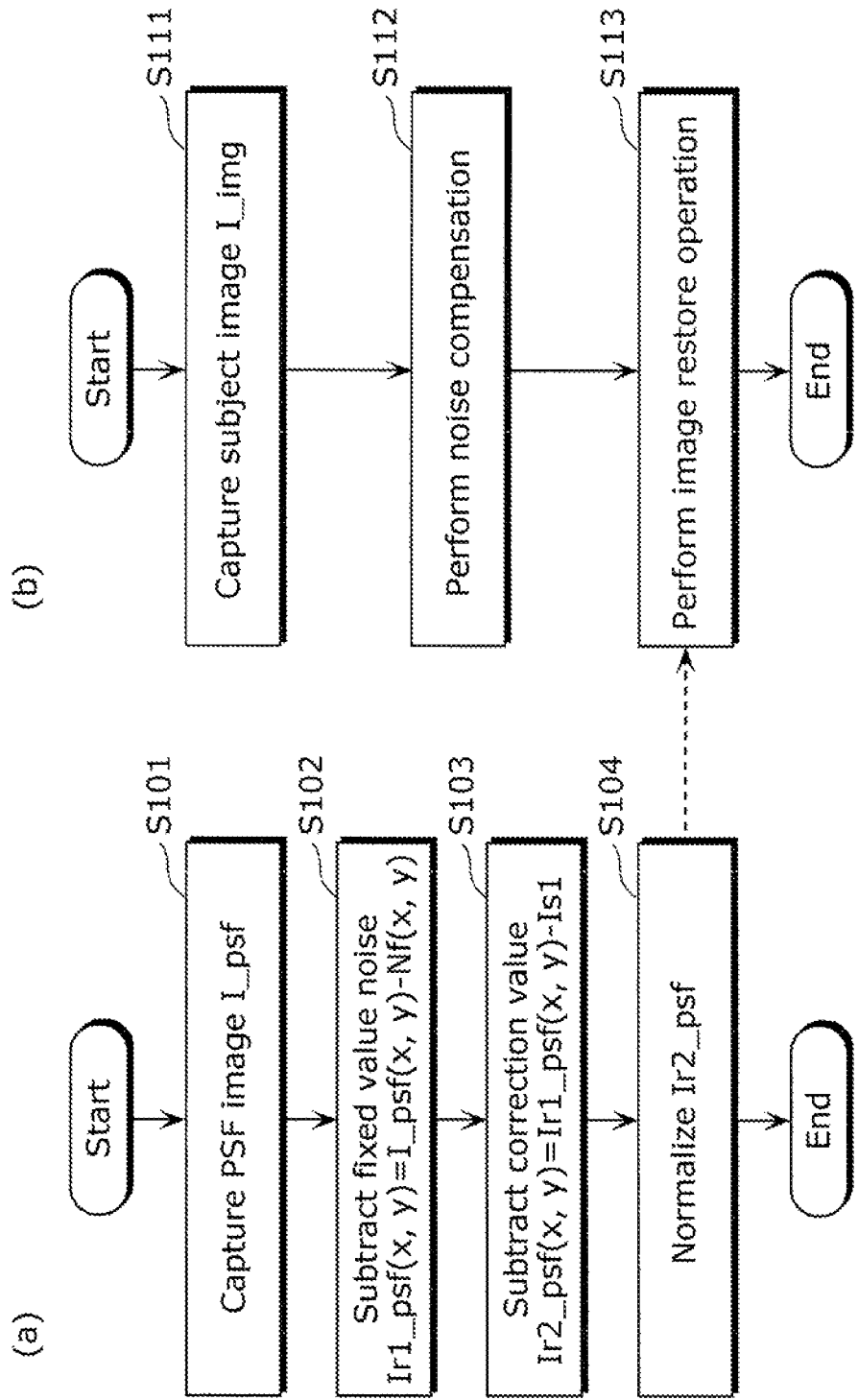
FIG. 10 shows flowcharts showing the operation of the imaging apparatus according to Embodiment 1 of the present invention.

FIG. 10 shows flowcharts showing the operation of the above-described imaging apparatus according to Embodiment 1 of the present invention. Specifically, (a) in FIG. 10 is a flowchart showing the flow of corrected PSF information generation processing. Further, (b) in FIG. 10 is a flowchart showing the flow of, image restore processing. As described above, it is sufficient to perform the processing shown in (a) in FIG. 10 at least once prior to the processing shown in (b) in FIG. 10, and the processing shown in the drawings need not necessarily be performed in synchronization.

First is a description of the flowchart shown in (a) in FIG. 10.

The optical system 1 captures a PSF image I_psf(x, y) (S101). Next, the luminance reduction unit 3 subtracts the luminance value Nf(x, y) of the fixed value noise from the PSF image I_psf(x, y) in accordance with Expression 2, and thereby obtains a PSF image Ir1_psf(x, y) obtained as a result of subtracting the luminance value of the fixed value noise (S102). Furthermore, the luminance reduction unit 3 obtains a corrected PSF image Ir2_psf(x, y) by subtracting, in accordance with Expression 3, the luminance value Is1 to from the PSF image Ir1_psf(x, y) obtained as a result of subtracting the luminance value of the fixed value noise (S103). It should be noted that in the corrected PSF image Ir2_psf(x, y), a luminance value smaller than the lowest luminance setting value is replaced with the lowest luminance setting value.

At last, the PSF capturing unit 2 normalizes the corrected PSF image Ir2_psf(x, y) obtained thereby, and outputs the result to the image restoration unit 5 (S104).

It should be noted that the luminance reduction unit 3 need not necessarily perform processing in steps S102 and S103 in the stated order, as described above. Specifically, the luminance reduction unit 3 may perform processing in steps S102 and S103 as the processing in one step by subtracting the sum of the luminance value Nf(x, y) of the fixed value noise and the luminance value Is1 from the PSF image I_psf(x, y).

It should be noted that fixed value noise subtraction processing in step S102 need not necessarily be executed when the fixed value noise is very small, for instance.

Next is a description of the flowchart shown in (b) in FIG. 10.

The optical system 1 captures a subject image I_img(x, y) (S111). Next, the subject capturing unit 4 performs noise compensation processing on the captured subject image I_img(x, y) (S112). At last, the image restoration unit 5 performs a restore operation based on the subject image I_img(x, y) on which noise compensation processing has been performed and the corrected PSF image Ir2_psf(x, y), thereby generating a restored image (S113).

It should be noted that noise compensation processing in step S112 need not necessarily be executed.

Next is a description of a reason for subtracting the luminance value Is1 and the setting range of the luminance value Is1. In the following description, a deteriorated image of the cuneal chart shown in (c) in FIG. 2 is used as a subject image I_img(x, y). Further, as a PSF image Ir1_psf(x, y) obtained by subtracting the luminance value is of the fixed value noise (hereinafter, also simply referred to as PSF image Ir1_psf(x, y)), an image obtained by adding Gaussian noise whose standard deviation σ is 0.3% of the highest luminance value to the PSF image in (b) in FIG. 2 is used (the luminance value at an image position having a negative luminance value has already been corrected to "0").

Figure 11:
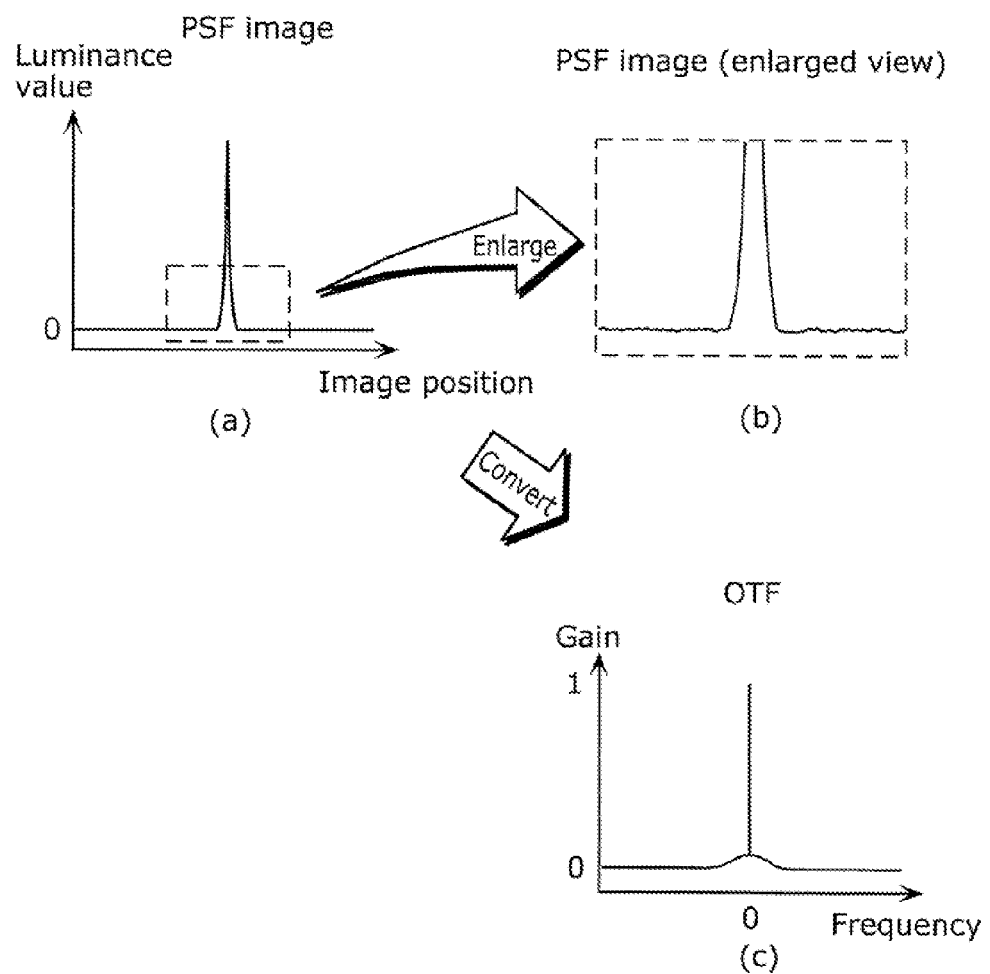
FIG. 11 shows PSF information in Embodiment 1 of the present invention.

(a) in FIG. 11 shows a luminance distribution on lines that include the position of the highest luminance value of the PSF image Ir1_psf(x, y). Since fixed value noise has been eliminated, a portion around the position of the highest luminance value has a luminance distribution based on the optical system 1 in FIG. 1, and the luminance value is substantially "0" at positions distant from the position of the highest luminance.

(b) in FIG. 11 shows a luminance distribution of an enlarged portion in the vicinity of the dashed line in (a) in FIG. 11. It can be seen that there is a slight luminance distribution (slight fluctuation in the luminance value) even at positions distant from the position of the highest luminance value, due to the influence of Gaussian noise that is randomly distributed.

(c) in FIG. 11 shows an OTF that is the Fourier transform of the PSF image Ir1_psf(x, y). As is clear from (c) in FIG. 11, the component at a frequency of 0 has significantly higher gain than that of other frequency components. A conceivable reason for this is a great increase in the average luminance value of the entire PSF image Ir1_psf(x, y) due to Gaussian noise as described above.

Therefore, when an image restore operation is performed using the PSF image Ir1_psf(x, y), the resolution of the restored image greatly decreases due to an increase in the difference between the OTF in (c) in FIG. 11 and the actual OTF.

Figure 12:
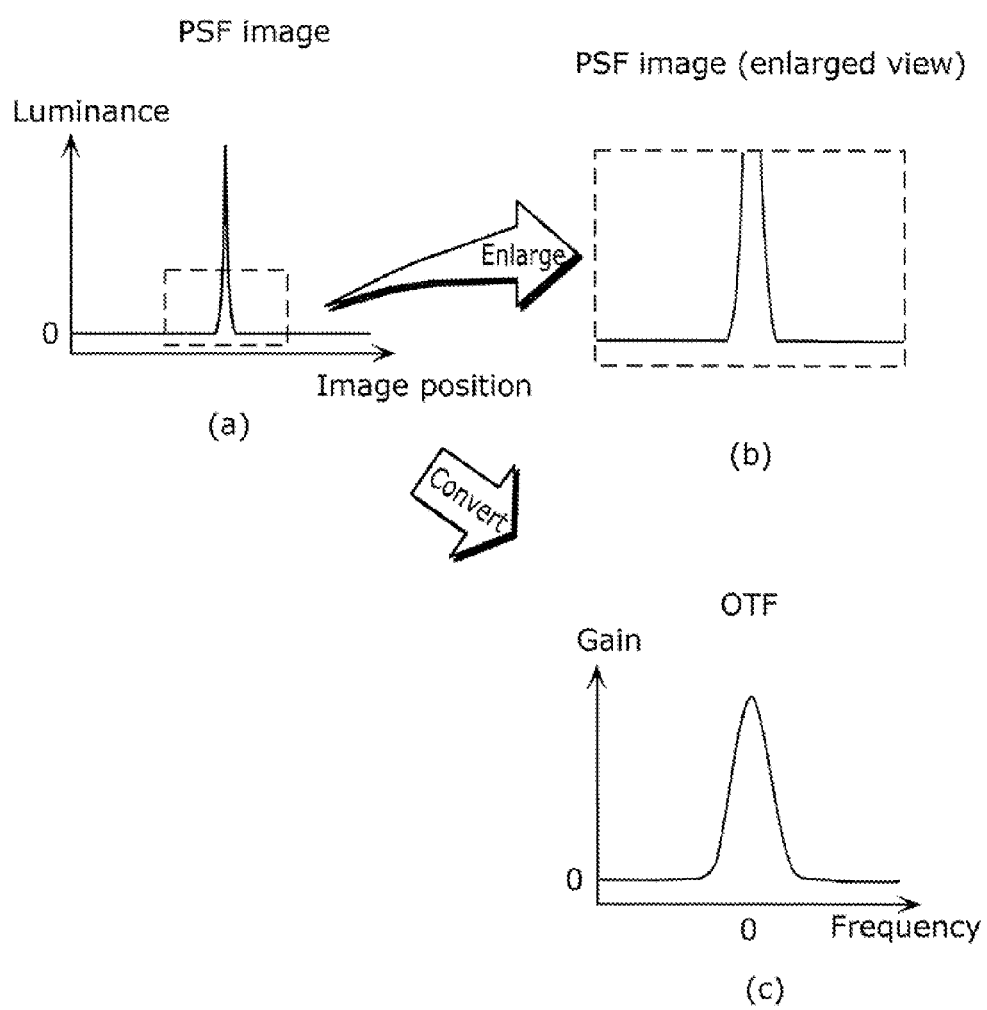
FIG. 12 shows PSF information in Embodiment 1 of the present invention.

(a) in FIG. 12 shows a luminance distribution on lines including the position of the highest luminance value of the corrected PSF image Ir2_psf(x, y) in the case where the predetermined luminance value Is1 is subtracted from all positions in the PSF image Ir1_psf(x, y) using Expression 3. (b) in FIG. 12 shows a luminance distribution of an enlarged portion in the vicinity of the dashed line in (a) in FIG. 12. It can be seen that the slight luminance distribution at positions distant from the position of the highest luminance value due to the influence of Gaussian noise that is randomly distributed has been eliminated.

(c) in FIG. 12 shows an OTF that is the Fourier transform of the corrected PSF image Ir2_psf(x, y). It can be seen that the gain of the component at a frequency of 0 has been improved, which is significantly higher compared with that of other frequency components in (c) in FIG. 11, thereby obtaining a distribution closer to the actual OTF distribution as in (b) in FIG. 8.

Figure 13:
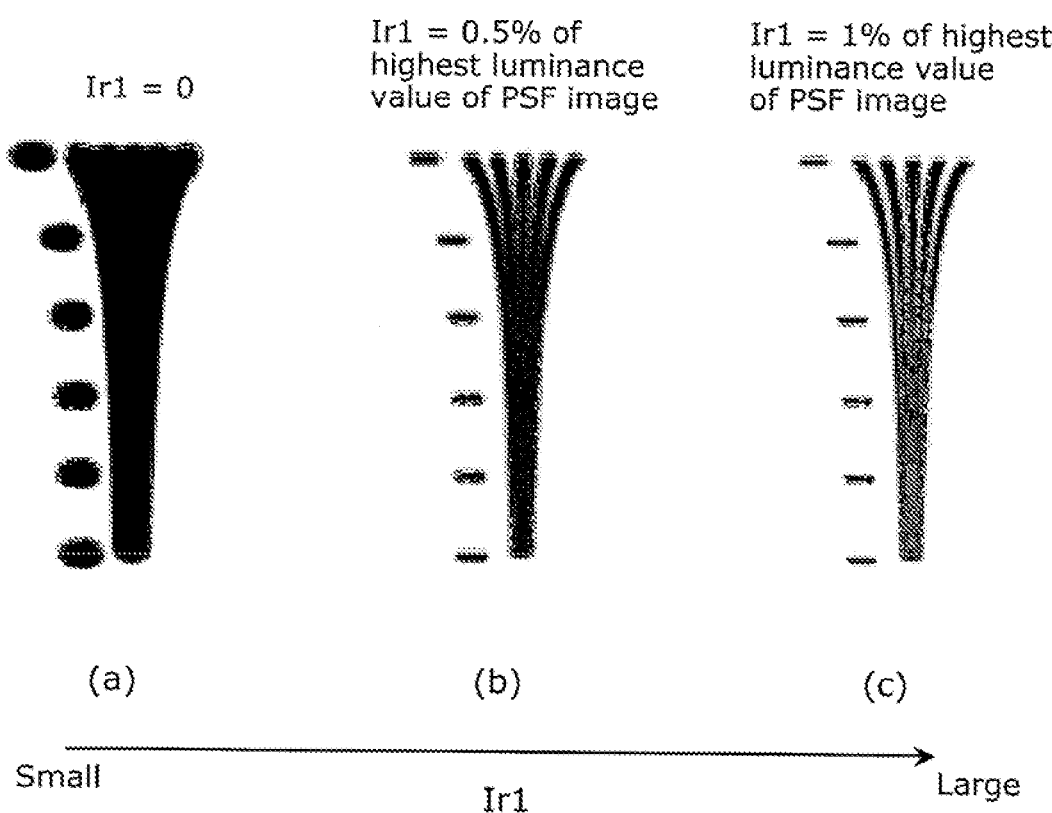
FIG. 13 shows restored images in Embodiment 1 of the present invention.

FIG. 13 shows restored images created by the image restoration unit 5 performing an image restore operation using the corrected PSF image Ir2_psf(x, y). (a) in FIG. 13 shows a restored image in the case where Is1 is 0, (b) in FIG. 13 shows a restored image in the case where Is1 constitutes 0.5% of the highest luminance value of the PSF image Ir1_psf(x, y), and (c) in FIG. 13 shows a restored image in the case where Is1 constitutes 1% of the highest luminance value of the PSF image Ir1_psf(x, y).

It can be seen that the resolution of the restored image in (b) in FIG. 13 has been improved compared with that in (a) in FIG. 13, and the resolution of the restored image in (c) in FIG. 13 has been further improved compared with that in (b) in FIG. 13.

Figure 14:
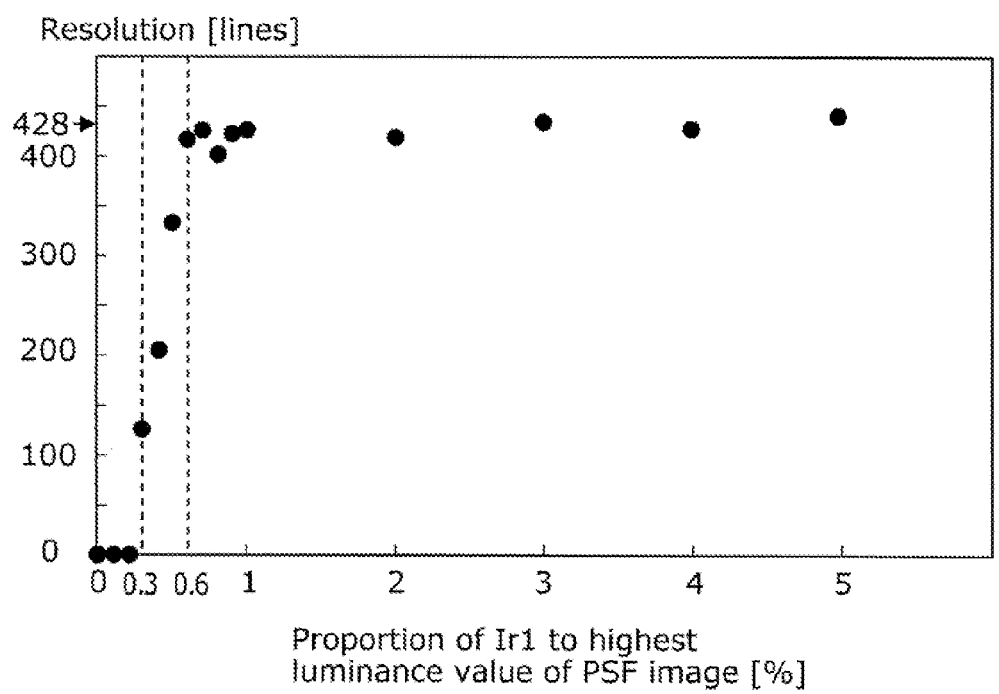
FIG. 14 shows the resolution of restored images in Embodiment 1 of the present invention.

FIG. 14 shows a change in the resolution of a restored image when Is1 is changed. In the graph shown in FIG. 14, the vertical axis represents the resolution measured using the resolution measurement tool HYRes3.1 distributed from CIPA, whereas the horizontal axis represents the proportion of Is1 to the highest luminance value of the PSF image Ir1_psf (x, y).

As is clear from FIG. 14, the resolution improves when Is1 is 0.3% or higher of the highest luminance value of the PSF image Ir1_psf(x, y). Specifically, in the PSF image, the ratio between the luminance value based on the actual PSF and the luminance value of noise exerts great influence on the resolution, and the resolution improves when Is1 is set to the standard deviation σ of Gaussian noise included in the PSF image or higher. Thus, assuming that random noise included in the PSF image is Gaussian noise, Is1 is preferably equal to or greater than the standard deviation σ of the Gaussian noise.

Furthermore, if Is1 is set to 0.6% or more of the highest luminance value of the PSF image Ir1_psf(x, y), it is possible to obtain the resolution equivalent to that in the case where there is no Gaussian noise. The resolution of a restored image stops improving if Is1 is higher than 30% of the highest luminance value of the PSF image Ir1_psf(x, y), which is not shown in the drawings. In other words, the resolution of a restored image starts decreasing if the proportion of Is1 to the highest luminance value of the PSF image Ir1_psf(x, y) is higher than 30%. Therefore, it is preferable that the proportion of Is to the highest luminance value of the PSF image be a value from 0.3% to 30%.

In this manner, although information on a region having a low luminance will be lost from the actual PSF luminance distribution by performing the subtraction of Expression 2, a decrease in the resolution due to noise that is superimposed on the PSF image has more influence than a decrease in the resolution of the restored image due to that lost, and thus correction of the PSF image by performing the subtraction of Expression 2 can improve the resolution of the restored image.

It should be noted that Gaussian noise (random noise) is considered to be caused by current noise or the like, and is noise whose occurrence position (pixel) randomly changes. However, Gaussian noise has a feature that the distribution of luminance values does not greatly change with time. Therefore, the standard deviation σ of Gaussian noise can be specified in a comparatively stable manner by approximating the distribution of luminance values of a black image captured in, for instance, a darkroom using a Gaussian distribution.

As described above, according to the imaging apparatus 10 according to Embodiment 1 of the present invention, when an image restore operation is performed, even in the case where unnecessary luminance (especially, random noise that fluctuates with time) of a captured PSF image is high, a correction luminance value greater than the luminance value of the fixed value noise is subtracted from the PSF image so as to correct the average luminance value to an appropriate value, thereby obtaining more accurate PSF information for restoring an image and enabling high-resolution image restoration.

An example of a general method of reducing random noise is a method using a median filter, frame integration, or a low-pass filter. Even if noise is reduced from the PSF image using such a median filter, frame integration, or a low-pass filter, it is difficult to completely eliminate random noise from a region of the PSF image where the luminance is low, and thus it is difficult to eliminate a change in the average luminance value of the PSF image. Therefore, even if noise elimination processing using a median filter, frame integration, or a low-pass filter is performed, it is not possible to restore a deteriorated image to a high-resolution image.

On the other hand, in the present embodiment, as shown by Expressions 2 and 3, a luminance value greater than the luminance value of the fixed value noise is forcibly subtracted from the PSF image. Therefore, a change in the average luminance value in the PSF image can be eliminated, thereby enabling restoration of a deteriorated image to a high-resolution image.

It should be noted that generally, when random noise is eliminated from a captured image, a method that does not change the average luminance value (e.g., median filtering, frame integration, or low-pass filtering) is used, and a method of forcibly subtracting a predetermined luminance value as in the present embodiment is not used. This is because a subject image having a comparatively low luminance in the captured image disappears if the predetermined luminance value is forcibly subtracted from the captured image, which will not allow restoration thereof. On the other hand, in the present embodiment, most of the subject image will not disappear since a luminance value is subtracted from the PSF image, and thus practical problems will not occur.

It should be noted that the luminance reduction unit 3 need not necessarily subtract the luminance value of the fixed value noise in accordance with Expression 2. In other words, it is sufficient for the luminance reduction unit 3 to subtract the luminance value of the fixed value noise from the luminance value of the PSF image as necessary, and thus it goes without saying that subtraction of the luminance value of the fixed value noise is not required.

It should be noted that in Expression 3 described above, although the luminance value Is1 is a constant value independent of a pixel position, the luminance value Is1 need not necessarily be a constant value independent of a pixel position. Specifically, it is sufficient that the luminance value Is1 is a value greater than 0 (preferably, the proportion of the value to the highest luminance value is 0.3% to 30%), and the luminance value Is1 may be a value different for each pixel.

It should be noted that although Embodiment 1 of the present invention has been described using an example in which the PSF has a symmetrical luminance distribution with the image position having the highest luminance being the center as shown in (b) in FIG. 2, it goes without saying that the present invention is applicable to an optical system having an asymmetrical PSF luminance distribution.

Embodiment 2

The configuration of the imaging apparatus 10 according to Embodiment 2 of the present invention is also shown in FIG. 1 as in the case of Embodiment 1. In the present embodiment, the operation of the luminance reduction unit 3 differs from that in Embodiment 1 in the block diagram of FIG. 1. Other operations are the same as those in Embodiment 1, and thus description thereof is omitted.

If there is fixed value noise that does not change with time depending on image positions (e.g., dark current noise, noise that occurs in predetermined lines or at predetermined pixel positions due to manufacturing defects of the imaging device, or the like), the luminance reduction unit 3 subtracts, from the PSF image I_psf(x, y), a luminance value Nf(x, y) of the fixed value noise obtained in advance at each image position as shown by Expression 2.

Furthermore, the luminance reduction unit 3 subtracts the luminance value at an image position having a luminance value smaller than a predetermined luminance value Is2 among image positions of the PSF image Ir1_psf(x, y) obtained by subtracting the luminance value of the fixed value noise, thereby correcting the luminance value to "0", as shown by Expression 4. Specifically, the luminance reduction unit 3 subtracts a luminance value greater than the luminance value of the fixed value noise at an image position where the luminance value of the PSF image I_psf(x, y) is smaller than the sum of the luminance value Nf(x, y) of the fixed value noise and the predetermined luminance value Is2 by performing subtraction processing in accordance with Expressions 2 and 4.

If $(Ir1\_psf(x,y) < Is2)$ $$Ir2\_psf(x,y) = 0 \quad \text{(Expression 4)}$$

It should be noted that although Expressions 2 and 4 are described as separate expressions, the luminance reduction unit 3 may rationalize the calculation by replacing Is2 with the sum of Is2 and Nf(x, y) and performing the calculation shown by Expressions 2 and 4 at the same time.

In other words, the PSF capturing unit 2 subtracts, from PSF information, a correction luminance value greater by the luminance value Is2 than the luminance value Nf of the fixed value noise that does not fluctuate with time using the luminance reduction unit 3, and outputs corrected PSF information obtained as a result of the subtraction. Specifically, the PSF capturing unit 2 subtracts the correction luminance value only from a region that is included in the entire region represented by the PSF information and has a smaller luminance value than the correction luminance value.

Thus, the PSF capturing unit 2 subtracts the correction luminance value greater by the luminance value Is2 than the luminance value Nf of the fixed value noise only from the luminance value of a pixel that is smaller than the correction luminance value among a plurality of pixels that constitute the PSF image I_psf(x, y). Furthermore, if the subtraction result is smaller than the lowest luminance setting value, the PSF capturing unit 2 generates a corrected PSF image Ir2_psf(x, y) by correcting the subtraction result so as to match the lowest luminance setting value.

In other words, the PSF capturing unit 2 replaces the luminance value of a region that is included in the entire region represented by to the PSF information and has a smaller luminance value than the correction luminance value with the lowest luminance setting value. Thus, the PSF capturing unit 2 replaces the luminance value of a pixel that is smaller than the sum of the luminance value Nf(x, y) of the fixed value noise and the luminance value Is2 with the lowest luminance setting value, among a plurality of pixels that constitute the PSF image I_psf(x, y).

In this manner, the PSF capturing unit 2 generates the corrected PSF image Ir2_psf(x, y) by correcting the luminance value of a pixel that is smaller than the correction luminance value to the lowest luminance setting value among a plurality of pixels that constitute the PSF image I_psf(x, y).

Next is a description of various operations of the imaging apparatus having the above configuration according to the present embodiment.

Figure 15:
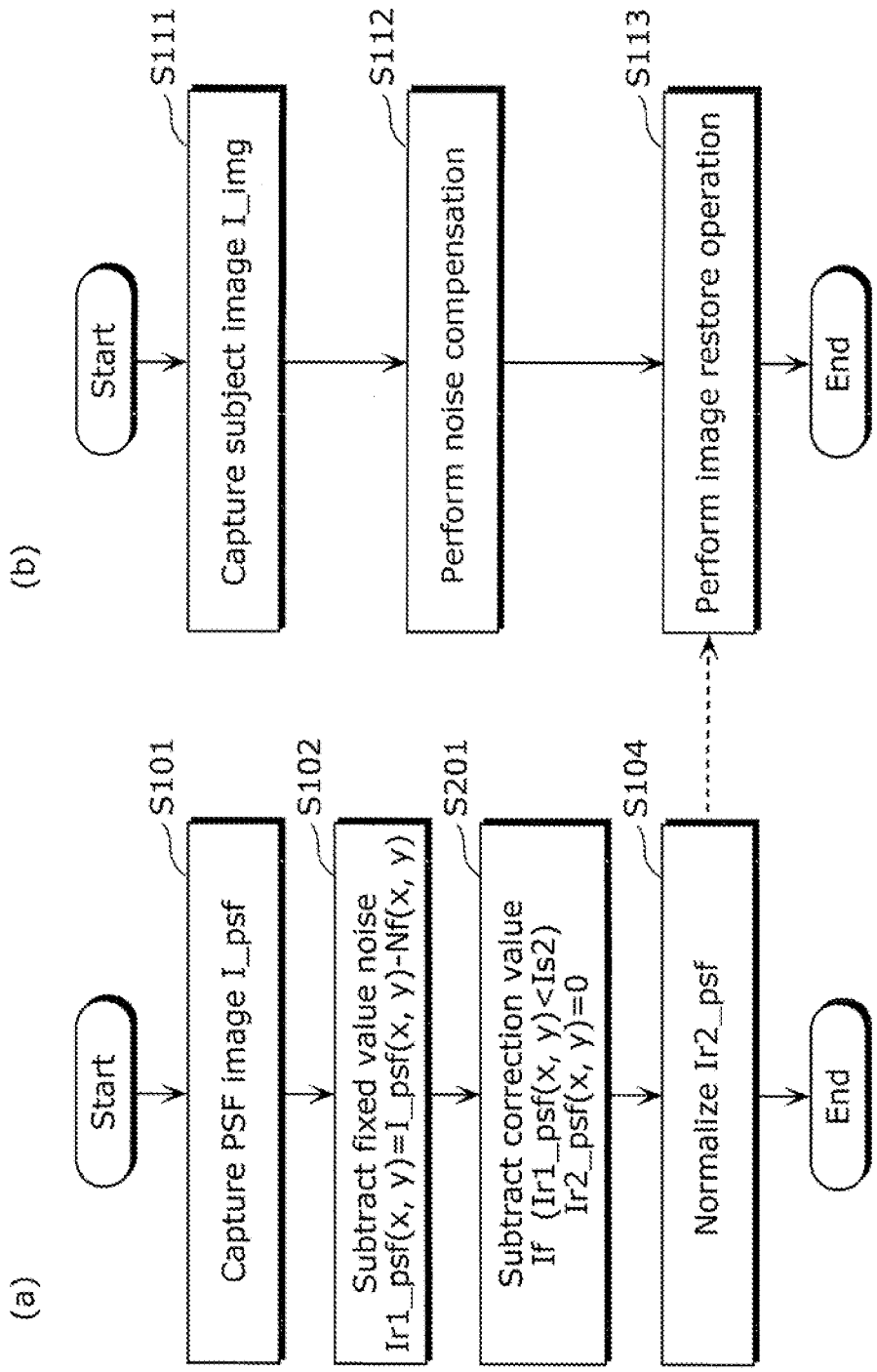
FIG. 15 shows flowcharts showing operation of the imaging apparatus according to Embodiment 2 of the present invention.

FIG. 15 shows flowcharts showing operation of the imaging apparatus according to Embodiment 2 of the present invention described above. Specifically, (a) in FIG. 15 is a flowchart showing the flow of corrected PSF information generation processing. Further, (b) in FIG. 15 is a flowchart showing the flow of image restore processing. It should be noted that the steps where the same processing as that in FIG. 10 is performed are given identical numerals in FIG. 15, and description thereof is omitted.

After performing fixed value noise subtraction processing, the luminance reduction unit 3 subtracts the correction luminance value only from a region that is included in the entire region represented by the PSF information and has a smaller luminance value than the correction luminance value, and outputs corrected PSF information obtained as a result of the subtraction (S201).

In this manner, the PSF capturing unit 2 generates a corrected PSF image Ir2_psf(x, y) by correcting the luminance value of a pixel that is smaller than the correction luminance value to the lowest luminance setting value in the PSF image I_psf(x, y).

Next is a description of a setting range of the luminance value Is2. In the following description, a deteriorated image of the cuneal chart shown in (c) in FIG. 2 is used as a subject image I_img(x, y). Further, as a PSF image Ir1_psf(x, y) obtained by subtracting the luminance value of the fixed value noise (hereinafter, also simply referred to as PSF image Ir1_psf(x, y)), an image obtained by adding Gaussian noise whose standard deviation σ is 0.3% of the highest luminance value to the PSF image in (b) in FIG. 2 is used (the luminance value at an image position having a negative luminance value has already been corrected to "0").

Figure 16:
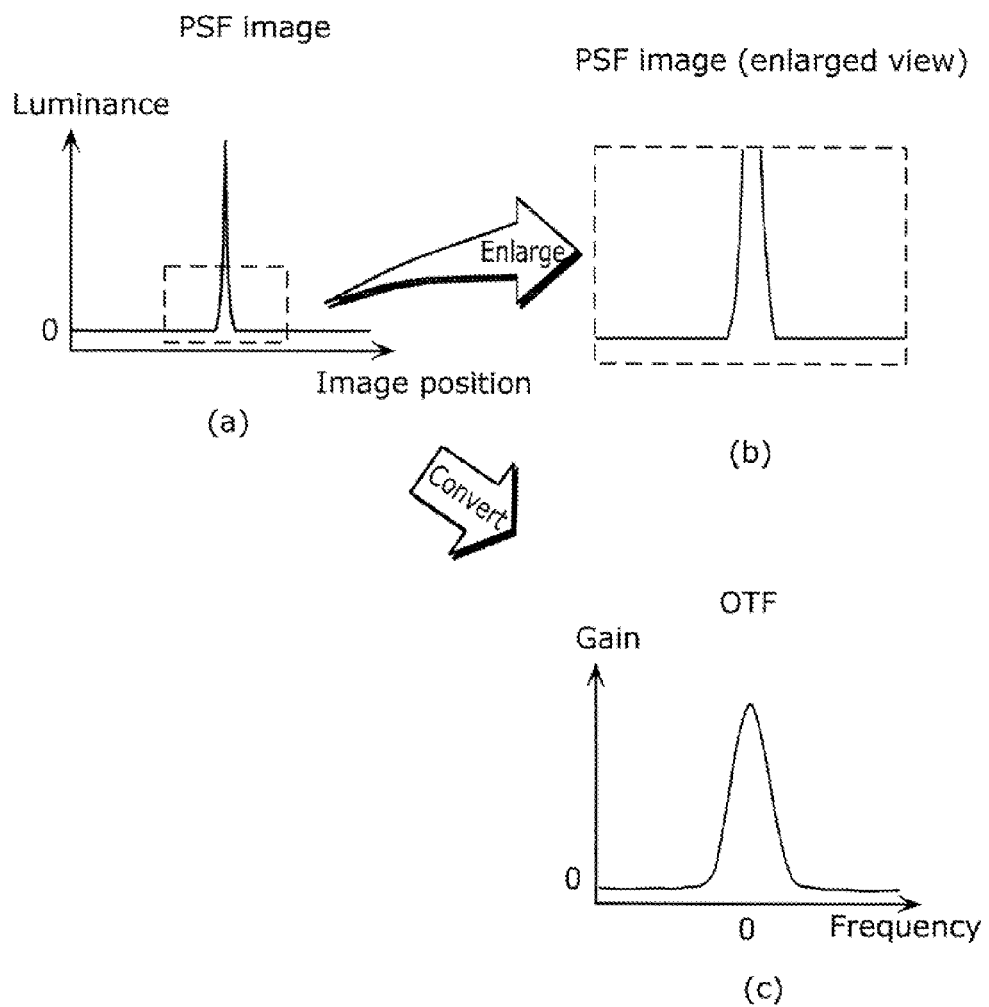
FIG. 16 shows PSF information in Embodiment 2 of the present invention.

(a) in FIG. 16 shows a luminance distribution on lines including a position of the highest luminance value of the corrected PSF image Ir2_psf(x, y) when the luminance value at a position having a smaller luminance value than the predetermined luminance value Is2 in the PSF image Ir1_psf(x, y) has been corrected to "0" using Expression 4. (b) in FIG. 16 shows a luminance distribution of an enlarged portion in the vicinity of the dashed line in (a) in FIG. 16. It can be seen that a slight luminance distribution at positions distant from the position of the highest luminance value due to the influence of Gaussian noise that is randomly distributed has been eliminated.

(c) in FIG. 16 shows an OTF that is the Fourier transform of the corrected PSF image Ir2_psf(x, y). It can be seen that the gain of the component at a frequency of 0, which is significantly higher compared with that of other frequency components in (c) in FIG. 11, has been corrected, thereby obtaining a distribution closer to the actual OTF distribution as in (b) in FIG. 8.

Figure 17:
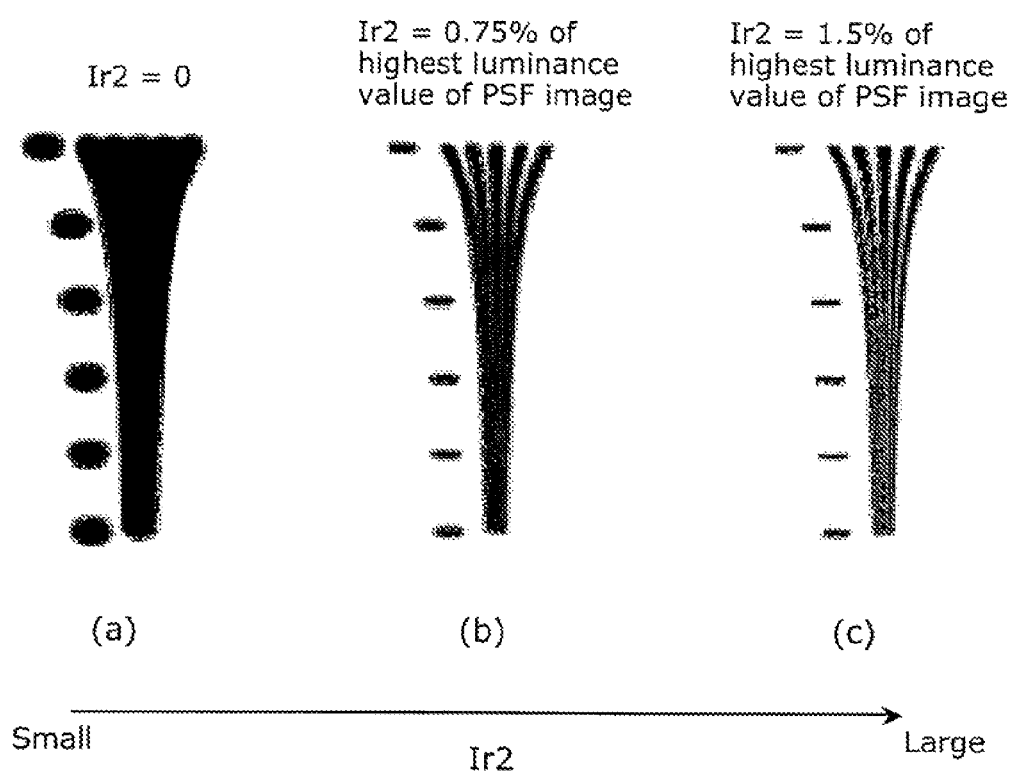
FIG. 17 shows restored images in Embodiment 2 of the present invention.

FIG. 17 shows restored images created by the image restoration unit 5 in FIG. 1 performing an image restore operation using the corrected PSF image Ir2_psf(x, y). (a) in FIG. 17 shows a restored image in the case where Is2 is 0, (b) in FIG. 17 shows a restored image in the case where Is2 constitutes 0.75% of the highest luminance value of the PSF image Ir1_psf(x, y), and (c) in FIG. 17 shows a restored image in the case where Is2 constitutes 1.5% of the highest luminance value of the PSF image Ir1_psf(x, y).

It can be seen that the resolution of the restored image in (b) in FIG. 17 has been improved compared with that in (a) in FIG. 17, and the resolution of the restored image in (c) in FIG. 17 has been further improved compared with that in (b) in FIG. 17.

Figure 18:
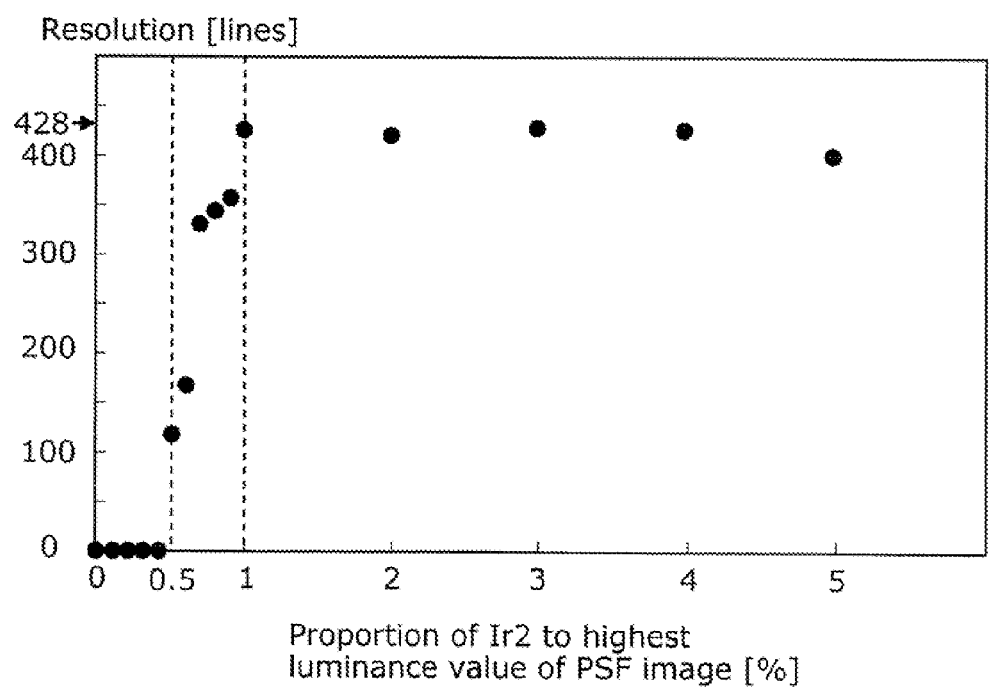
FIG. 18 shows the resolution of restored images in Embodiment 2 of the present invention.

FIG. 18 shows a change in the resolution of a restored image when Is2 is changed. In the graph shown in FIG. 18, the vertical axis represents the resolution measured using the resolution measurement tool HYRes3.1 distributed from CIPA, whereas the horizontal axis represents the proportion of Is2 to the highest luminance value of the PSF image Ir1_psf(x, y).

As is clear from FIG. 18, the resolution improves when Is2 is set to 0.5% or more of the highest luminance value of the PSF image Ir1_psf(x, y). Specifically, in the PSF image, the ratio between the luminance value based on the actual PSF and the luminance value of noise exerts great influence on the resolution, and the resolution improves when Is2 is set to a value about 1.6 (=0.5/0.3) times or more greater than the standard deviation σ of Gaussian noise included in the PSF image. Thus, assuming that random noise included in the PSF image is Gaussian noise, Is2 is preferably 1.6 times or more greater than the standard deviation of the Gaussian noise.

Furthermore, when Is2 is set to 1% or more of the highest luminance value of the PSF image Ir1_psf(x, y), it is possible to obtain the resolution equivalent to that in the case where there is no Gaussian noise. The resolution of a restored image stops improving if Is2 is higher than 40% of the highest luminance value of the PSF image Ir1_psf(x, y), which is not shown in the drawings. In other words, the resolution of a restored image starts decreasing if the proportion of Is2 to the highest luminance value of the PSF image Ir1_psf(x, y) is higher than 40%. Thus, it is preferable that the proportion of Is2 to the highest luminance value of the PSF image be a value from 0.5% to 40%.

In this manner, although information on a region having a low luminance in the actual PSF luminance distribution will be lost by performing the correction of Expression 4, a decrease in the resolution due to noise that is superimposed on the PSF image has more influence than a decrease in the resolution of the restored image due to that lost, and thus correction of the PSF image using Expression 4 can improve the resolution of the restored image.

As described above, according to the imaging apparatus 10 according to Embodiment 2 of the present invention, when an image restore operation is performed, even in the case where unnecessary luminance (especially, random noise that fluctuates with time) of a captured PSF image is high, a luminance value greater than the fixed value noise is subtracted from the PSF image so as to correct the average luminance value to an appropriate value, thereby obtaining more accurate PSF information for restoring an image and enabling high-resolution image restoration.

It should be noted that although the imaging apparatus 10 according to the present embodiment corrects the luminance value at an image position having a luminance value smaller than Is2 in the PSF image Ir1_psf as shown by Expression 4, even when the luminance value at an image position having a luminance value equal to or smaller than Is2 is corrected as shown by Expression 5, substantially the same effects can be obtained.

If $(Ir1\_psf(x,y) \leq Is2)$ $Ir2\_psf(x,y)=0$ (Expression 5)

It should be noted that the luminance reduction unit 3 need not necessarily subtract the luminance value of the fixed value noise, which is shown by Expression 2. In other words, it is sufficient for the luminance reduction unit 3 to subtract the luminance value of the fixed value noise from the luminance value of the PSF image as necessary, and thus it goes without saying that subtraction of the luminance value of the fixed value noise is not required.

It should be noted that in Expression 4 described above, although the luminance value Is2 is a constant value independent of a pixel position, Is2 need not necessarily be a constant value independent of a pixel position. Specifically, it is sufficient that the luminance value Is2 is a value greater than 0 (preferably, the proportion of the value to the highest luminance value is 0.5% to 40%), and the luminance value Is2 may be a value different for each pixel.

It should be noted that although Embodiment 2 of the present invention has been described using an example in which the PSF has a symmetrical luminance distribution with the image position having the highest luminance value being the center as shown in (b) in FIG. 2, it goes without saying that the present embodiment is applicable to an optical system having an asymmetrical PSF luminance distribution.

Although the above is a description of the imaging apparatus 10 according to an aspect of the present invention based on the embodiments, the present invention is not limited to those embodiments. The scope of the present invention includes various modifications to the embodiments that may be conceived by those skilled in the art or forms constructed by combining constituent elements in different embodiments, which do not depart from the essence of the present invention.

For example, although the imaging apparatus 10 includes the PSF capturing unit 2 in Embodiments 1 and 2 described above, the imaging apparatus 10 need not necessarily include the PSF capturing unit 2. Specifically, it is sufficient for the imaging apparatus 10 to store corrected PSF information generated in advance. Even in this case, the imaging apparatus 10 can restore a high-resolution subject image since the imaging apparatus 10 can perform a restore operation for restoring subject information based on the corrected PSF information stored in advance and the subject information.

Further, a part or all of the constituent elements included in the imaging apparatus 10 in Embodiments 1 and 2 described above may be constituted by a single system large scale integration (LSI). For example, the imaging apparatus 10 may be constituted by a system LST having the PSF capturing unit 2, the subject capturing unit 4, and the image restoration unit 5.

The system LSI is a super multi-function LSI that is manufactured by integrating multiple components in one chip, and is specifically a computer system configured so as to include a microprocessor, a read only memory (ROM), a random access memory (RAM), and so on. A computer program is stored in the RAM. The system LSI accomplishes its functions through the operation of the microprocessor in accordance with the computer program.

It should be noted that although a system LSI is mentioned here, the integrated circuit can also be called an IC, an LSI, a super LSI, and an ultra LSI, depending on the difference in the degree of integration. Furthermore, the method of circuit integration is not limited to LSIs, and implementation through a dedicated circuit or a general-purpose processor is also possible. A field programmable gate array (FPGA) that allows programming after LSI manufacturing or a reconfigurable processor that allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

Further, the present invention can be implemented, not only as an imaging apparatus that includes such characteristic processing units as those described above, but also as an image restoration method having, as steps, the characteristic processing units included in such an imaging apparatus. Furthermore, the present invention can also be realized as a computer program that causes a computer to execute the characteristic steps included in the image restoration method. In addition, it goes without saying that such a computer program can be distributed via a computer-readable recording medium such as a compact disk read-only memory (CD-ROM) or via a communication network such as the Internet.

The present invention is useful in imaging apparatuses in general that capture a subject image using an optical system, such as a digital still camera, a digital video camera, a mobile telephone camera, a monitoring camera, a medical camera, a telescope, a microscope, a vehicle-installed camera, a stereo ranging camera, a stereoscopic video shooting multi-lens camera, a light beam space capture camera for free-viewpoint video creation, an extended depth of field camera (EDOF), and a camera using flexible depth of field (FDOF) photography.

REFERENCE SIGNS LIST

1 Optical system
2 PSF capturing unit
3 Luminance reduction unit
4 Subject capturing unit
5 Image restoration unit
10 Imaging apparatus
101 Deteriorated-image noise adding unit
102 PSF-image noise adding unit
103 Image restore operation unit

The invention claimed is:

1. An imaging apparatus comprising:
an optical system;
a point spread function (PSF) capturing unit configured to acquire PSF information captured by the optical system, and output corrected PSF information;
a subject capturing unit configured to acquire subject information captured by the optical system, and output the acquired subject information; and
an image restoration unit configured to perform a restore operation for restoring the subject information, based on the corrected PSF information and the subject information,
wherein the PSF capturing unit is configured to subtract a correction luminance value from a luminance value of a PSF image indicated by the PSF information, and output the corrected PSF information obtained as a result of the subtraction, the correction luminance value being greater by a luminance value Is than a luminance value Nf of fixed value noise that does not fluctuate with time.

2. The imaging apparatus according to claim 1,
wherein the PSF capturing unit is configured to subtract the correction luminance value from an entire region represented by the PSF information.

3. The imaging apparatus according to claim 2,
wherein assuming that random noise included in the PSF information is Gaussian noise, the luminance value Is is equal to or greater than a standard deviation of the Gaussian noise.

4. The imaging apparatus according to claim 2,
wherein the luminance value Is is a value from 0.3% to 30% of a highest luminance value of the PSF information.

5. The imaging apparatus according to claim 1,
wherein the PSF capturing unit is configured to subtract the correction luminance value only from a region having a luminance value equal to or smaller than the correction luminance value, or a region having a luminance value smaller than the correction luminance value, the regions being included in the entire region represented by the PSF information.

6. The imaging apparatus according to claim 5,
wherein assuming that random noise included in the PSF information is Gaussian noise, the luminance value Is is 1.6 times or more greater than a standard deviation of the Gaussian noise.

7. The imaging apparatus according to claim 5,
wherein the luminance value Is is a value from 0.5% to 40% of a highest luminance value of the PSF information.

8. An imaging apparatus comprising:
an optical system;
a subject capturing unit configured to acquire subject information captured by the optical system, and output the acquired subject information; and
an image restoration unit configured to perform a restore operation for restoring the subject information based on corrected point spread function (PSF) information stored in advance and the subject information,
wherein the corrected PSF information is information obtained by subtracting a correction luminance value from a luminance value of a PSF image indicated by PSF information captured by the optical system, the correction luminance value being greater by a luminance value Is than a luminance value Nf of fixed value noise that does not fluctuate with time.

9. An image restoration method comprising:
acquiring point spread function (PSF) information captured by an optical system, and outputting corrected PSF information;
acquiring subject information captured by the optical system, and outputting the acquired subject information; and
performing a restore operation for restoring the subject information, based on the corrected PSF information and the subject information,
wherein in the acquiring of PSF information, a correction luminance value is subtracted from a luminance value of a PSF image indicated by the PSF information, and the corrected PSF information obtained as a result of the subtraction is output, the correction luminance value being greater by a luminance value Is than a luminance value Nf of fixed value noise that does not fluctuate with time.

10. A non-transitory computer-readable recording medium storing a program for causing a computer to execute the image restoration method according to claim 9.

* * * * *